(12) United States Patent
Suzuki et al.

(10) Patent No.: US 7,659,007 B2
(45) Date of Patent: Feb. 9, 2010

(54) DECORATIVE SHEET, MOLDED ARTICLE, MOTOR VEHICLE, AND PRODUCTION METHOD OF MOLDED ARTICLE

(75) Inventors: Yasuo Suzuki, Shizuoka (JP); Naohiro Morozumi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 334 days.

(21) Appl. No.: 10/972,168

(22) Filed: Oct. 22, 2004

(65) Prior Publication Data

US 2005/0112330 A1    May 26, 2005

(30) Foreign Application Priority Data

Nov. 26, 2003  (JP)  .............................. 2003-395955

(51) Int. Cl.
*B32B 3/00* (2006.01)
*B32B 7/02* (2006.01)
*B32B 15/00* (2006.01)
*B32B 15/08* (2006.01)
*B60R 13/00* (2006.01)

(52) U.S. Cl. ...................... 428/542.2; 428/31; 428/172; 428/207; 428/209; 428/213; 428/218; 428/425.8; 428/458; 296/1.08; 296/181.2

(58) Field of Classification Search .................. 428/31, 428/172, 207, 209, 212, 217, 218, 412, 423.7, 428/424.8, 425.8, 458, 462, 542.2, 913.3; 296/181.2, 146.7, 901.1, 1.08

See application file for complete search history.

(56) References Cited

U.S. PATENT DOCUMENTS

| 4,369,222 A | 1/1983 | Hedrick et al. |
| 4,681,648 A | 7/1987 | Maeda |
| 4,916,008 A | 4/1990 | Katayama et al. |
| 4,918,800 A | 4/1990 | Reafler |
| 6,458,464 B1 * | 10/2002 | Takeda ...................... 428/457 |

FOREIGN PATENT DOCUMENTS

| EP | 0 441 199 B1 | 8/1991 |
| EP | 1 316 419 A2 | 6/2003 |
| JP | 7-112521 A | 5/1995 |
| JP | 10-249999 | 9/1998 |
| JP | 2000-016191 | 1/2000 |

(Continued)

OTHER PUBLICATIONS

Yasuo Suzuki et al.; "Decorative Sheet, Decorated Molded Article, and Motor Vehicle"; U.S. Appl. No. 11/718,646; filed May 4, 2007.
Yasuo Suzuki et al.; "Process for Production of Moldings and Motor Vehicles"; U.S. Appl. No. 11/718,651; filed May 4, 2007.

(Continued)

*Primary Examiner*—Donald Loney
(74) *Attorney, Agent, or Firm*—Keating & Bennett, LLP

(57) ABSTRACT

A decorative sheet includes a base member having a principal surface, and a decoration layer disposed on the principal surface of the base member. The base member is formed from a first resin material. The decoration layer includes a resin layer formed from a second resin material having a deflection temperature under load which is lower than that of the first resin material, and a metal layer which is in contact with the resin layer.

16 Claims, 11 Drawing Sheets

FOREIGN PATENT DOCUMENTS

| | | |
|---|---|---|
| JP | 2001-328216 A | 11/2001 |
| JP | 2002-18894 A | 1/2002 |
| JP | 2002-079573 | 3/2002 |
| JP | 2002-275405 | 9/2002 |
| JP | 2002-301789 A | 10/2002 |
| JP | 2003-200502 | 7/2003 |
| WO | WO 00/23287 | 4/2000 |

OTHER PUBLICATIONS

Naohiro Morozumi et al.; "Decorative Sheet, Formed Product and Transporation Apparatus"; U.S. Appl. No. 11/749,953; filed May 17, 2007.

Naohiro Morozumi et al.; "Decorative Sheet, Formed Product and Transportation Apparatus"; U.S. Appl. No. 11/749,958; filed May 17, 2007.

Yasuo Suzuki et al.; "Decorative Sheet, Molded Article, and Motor Vehicle Provided With the Same"; U.S. Appl. No. 10/509,369; filed Sep. 28, 2004.

Suzuki et al.: "Decorative Sheet, Decorated Formed Product, Method of Making the Decorative Sheet and Method of Making the Decorated Formed Product," U.S. Appl. No. 12/336,639; filed on Dec. 17, 2008.

Official communication issued in counterpart Japanese Application No. 2003-395955, mailed on Oct. 21, 2008.

* cited by examiner

DECORATIVE SHEET, MOLDED ARTICLE, MOTOR VEHICLE, AND PRODUCTION METHOD OF MOLDED ARTICLE

BACKGROUND OF THE INVENTION

The present invention relates to a decorative sheet used for decorating a molded article. The present invention also relates to a molded article provided with such a decorative sheet, a production method thereof, and a motor vehicle provided with such a molded article.

Recently, as a technique for decorating various kinds of molded articles, a technique for attaching a decorative sheet onto a surface of a molded article has been proposed. The decorative sheet used in this technique is disclosed in Japanese Laid-Open Patent Publication No. 10-249999. The decorative sheet disclosed in this publication includes a base member and an ink layer formed by printing on a surface of the base member. The decorative sheet is attached to a molded article with an adhesive applied to the ink layer. The publication also describes that, instead of the ink layer, a metal layer formed of a metal material such as aluminum or chromium may be disposed on the surface of the base member.

When such a decorative sheet is used, the molded article can be easily recycled as compared with the case of paint application using a coating material. In addition, such a decorative sheet can create a beautiful appearance which is different from the paint application, so that a decorative quality can be improved.

A conventional decorative sheet including a metal layer is, however, suitable for the decoration of a molded article having a flat surface, but is not suitable for the decoration of a molded article having an uneven surface. As a result of examination by the inventors of the present invention, it was discovered that when a decorative sheet including a metal layer was attached to a molded article having an uneven surface (a hole for a screw, or a fixing structure for fixing to other members, for example), or a molded article having a deep drawing shape, the metal layer was broken and the color became locally pale, thereby deteriorating the decorative appearance.

SUMMARY OF THE INVENTION

In order to overcome the problems described above, preferred embodiments of the present invention provide a decorative sheet preferably used for the decoration of a molded article having an uneven surface, and a molded article to which the decorative sheet is attached, and a production method thereof, and a motor vehicle provided with such a molded article.

A decorative sheet according to a preferred embodiment of the present invention includes a base member having a principal surface, and a decoration layer disposed on the principal surface of the base member, wherein the base member is formed from a first resin material, and the decoration layer includes a resin layer formed from a second resin material having a deflection temperature under load that is lower than a deflection temperature under load of the first resin material, and a metal layer which is in contact with the resin layer.

Preferably, the second resin material is a resin material having a deflection temperature under load of about 85° C. or less measured under a load of about 0.45 MPa in accordance with ASTM D648.

Preferably, the first resin material is a thermoplastic resin material.

Preferably, the second resin material is a thermoplastic resin material.

In a preferred embodiment, the resin layer is located at a position that is closer to the base member than the metal layer.

In a preferred embodiment, the metal layer is located at a position that is closer to the base member than the resin layer.

In a preferred embodiment, the decorative sheet according to the present invention further includes a coloring layer disposed on the decoration layer.

Preferably, a thickness of the base member is not less than about 100 μm and not greater than about 1,000 μm.

Preferably, the metal layer is formed of a metal having a Mohs' hardness of about 3 or less.

Preferably, the metal layer is formed from a material selected from a group of tin, aluminum, gold, copper, zinc, silver, and indium, and alloys thereof.

Preferably, a thickness of the metal layer is not less than about 0.2 μm and not greater than about 1.2 μm.

In a preferred embodiment, two or more decoration layers are provided.

Preferably, a total thickness of the decoration layers is about 100 μm or less.

The molded article according to various preferred embodiments of the present invention preferably includes a molded article body and the decorative sheet with the above-described structure joined to a surface of the molded article body.

In a preferred embodiment, the molded article body has a deep drawing shape.

In a preferred embodiment, the decorative sheet joined to the surface of the molded article body has a first portion having the largest thickness, and a second portion having a thickness which is approximately 70% or less of the thickness of the first portion.

In a preferred embodiment, the second portion of the decorative sheet includes a third portion having a thickness which is about 50% or less of the thickness of the first portion.

In a preferred embodiment, grain is formed on the surface of the molded article body.

In a preferred embodiment, a surface of the metal layer has a shape reflecting the grain, and a surface of the decorative sheet opposite to the side of the molded article body is smoother than the surface of the metal layer.

The motor vehicle according to another preferred embodiment of the present invention is provided with the molded article having the above-described structure.

A production method of a molded article according to a preferred embodiment of the present invention includes the steps of preparing a molded article body and the decorative sheet having the above-described structure, heating the decorative sheet, and removing the air existing between the decorative sheet and the molded article body after overlapping the heated decorative sheet and the molded article body, thereby joining the decorative sheet to the molded article body.

The decoration layer included in the decorative sheet according to preferred embodiments of the present invention preferably includes a resin layer formed from a second resin material having a deflection temperature under load that is lower than a deflection temperature under load of the first resin material for forming a base member, and a metal layer which is in contact with the resin layer. The resin layer formed from the second resin material is more easily deformed and spread than the base member with respect to a stress applied in shaping and joining, so that the metal layer which is in contact with the resin layer is suitably spread by following a contour and shape of the resin layer which is more easily spread than the base member. Therefore, the breakage of the metal layer is effectively prevented. As a result, a beautiful appearance can be attained.

Thus, according to preferred embodiments of the present invention, a decorative sheet suitably used for decorating a molded article having an uneven surface, a molded article provided with such a decorative sheet and a production method thereof, and a motor vehicle provided with such a molded article are provided.

Other features, elements, characteristics and advantages of the present invention will become more apparent from the following detailed description of preferred embodiments of the present invention with reference to the attached drawings.

BRIEF DESCRIPTION OF THE DRAWINGS

The foregoing summary as well as the following detailed description of the preferred embodiments of the present invention will be better understood when read in conjunction with the appended drawings. For the purpose of illustrating the present invention, there is shown in the drawings embodiments which are presently preferred. It should be understood, however, that the present invention is not limited to the precise arrangements and instrumentalities shown.

DETAILED DESCRIPTION OF PREFERRED EMBODIMENTS

Hereinafter, preferred embodiments of the present invention will be described with reference to the accompanying drawings. However, the present invention is not limited to the preferred embodiments described below.

First Preferred Embodiment

Figure 1:
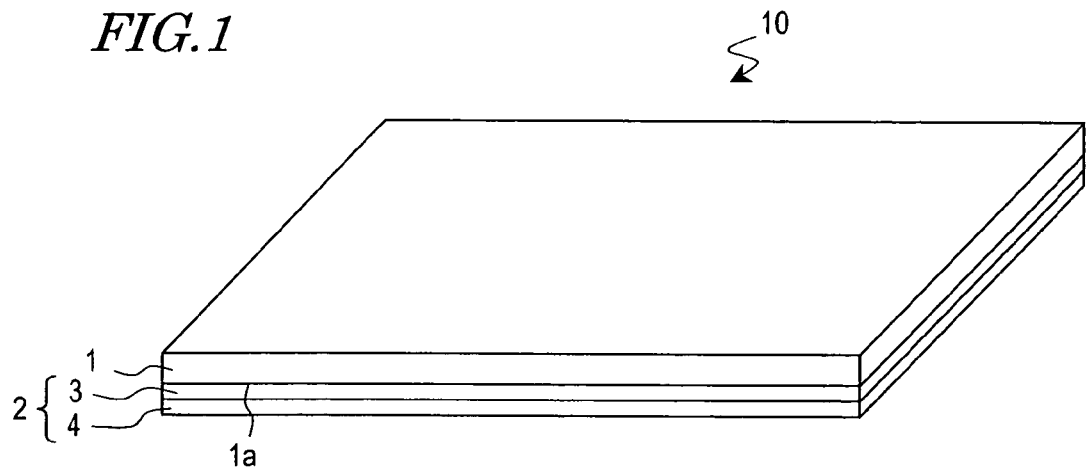
FIG. 1 is a perspective view schematically showing a decorative sheet 10 according to a preferred embodiment of the present invention.
Figure 2:
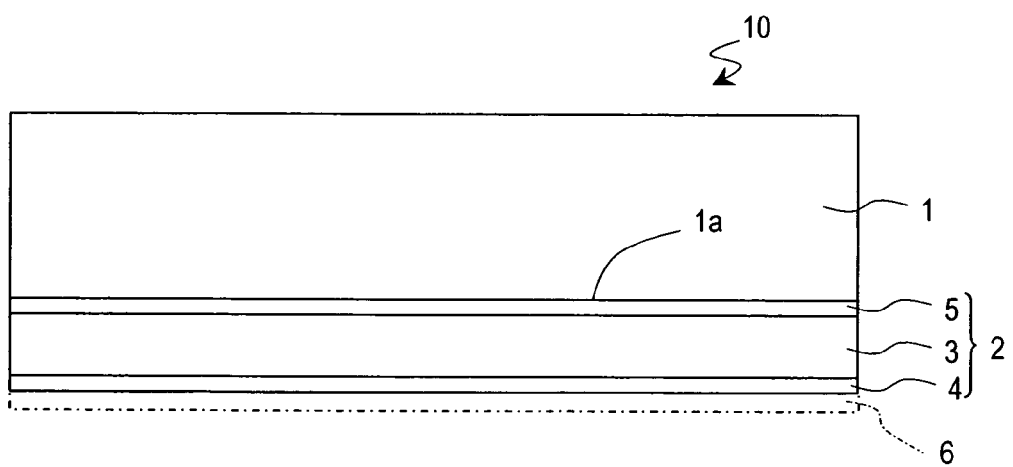
FIG. 2 is a sectional view schematically showing the decorative sheet 10 according to a preferred embodiment of the present invention.

FIGS. 1 and 2 schematically show a decorative sheet 10 according to a first preferred embodiment of the present invention. The decorative sheet 10 includes a base member 1 preferably formed from a resin material and a decoration layer 2 disposed on a principal surface 1a of the base member 1.

The decoration layer 2 has a laminated structure in which a resin layer 3 formed from a resin material and a metal layer 4 formed from a metal material are laminated. The decoration layer 2 in this preferred embodiment further includes an adhesive layer 5 as shown in FIG. 2. The adhesive layer 5 attaches and fixes the decoration layer 2 to the principal surface 1a of the base member 1. The base member 1, the adhesive layer 5, the resin layer 3, and the metal layer 4 are laminated in this order. Thus, the resin layer 3 is located at a position that is closer to the base member 1 than the metal layer 4. An adhesive layer 6 shown by a chain line in FIG. 2 is applied on the decoration layer 2 when the decorative sheet 10 is to be attached.

Figure 3A:
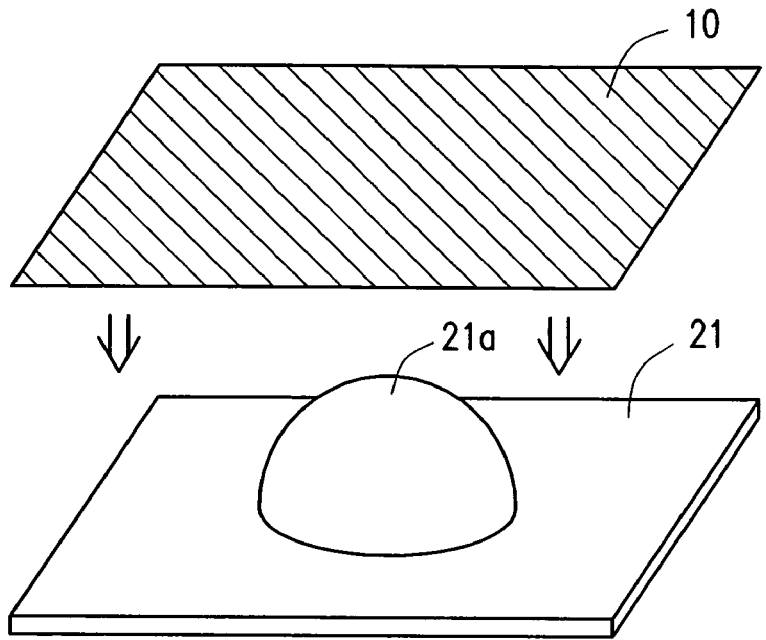
FIGS. 3A, 3B, and 3C are views schematically showing one exemplary use of the decorative sheet 10 according to a preferred embodiment of the present invention.
Figure 3B:
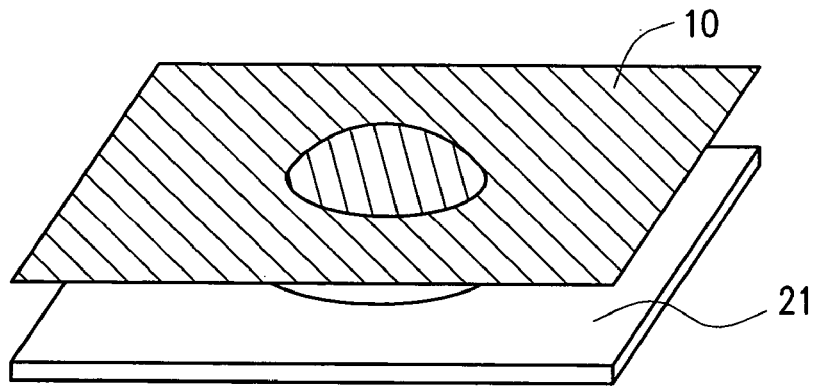
Figure 3C:
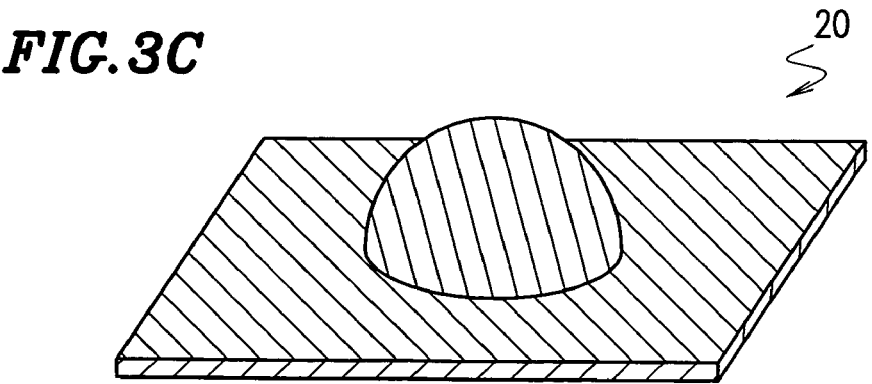

An exemplary use of the decorative sheet 10 is shown in FIGS. 3A, 3B, and 3C. The decorative sheet 10 is attached to a surface of a molded article body 21, thereby decorating the molded article body 21, as shown in FIGS. 3A, 3B, and 3C. A combination of a metallic luster caused by a reflection of light from the metal layer 4 of the decoration layer 2 and a shine of the base member 1 positioned in an outermost surface of a molded article 20 provides a beautiful appearance.

The molded article body 21 shown in FIG. 3A preferably has a substantially hemispherical (bowl-like) protruding portion 21a, and accordingly has an uneven surface. Therefore, when the decorative sheet 10 is attached, the decorative sheet 10 is spread so as to follow the unevenness. In order to preferably perform the spreading of the decorative sheet 10, typically, the decorative sheet 10 is attached after the decorative sheet 10 has been heated and softened.

In the case where a conventional decorative sheet is used, if a molded article body has an uneven surface, a metal layer is not spread well during attachment, and the metal layer may sometimes be broken. The inventors of the present invention performed various studies about the structure of the decorative sheet. As a result of the studies, the inventors of the present invention discovered that the breakage of the metal layer 4 was effectively prevented by forming the decoration layer 2 so as to have a layered structure, as shown in FIGS. 1 and 2, and by forming the resin layer 3 constituting the layered structure from a resin layer including a specific physical property. Thus, the inventors thought of and developed the present invention.

The resin material for forming the resin layer 3 is preferably a resin material having a lower deflection temperature under load than that of a resin material for forming the base member 1. The term "deflection temperature under load" means a temperature at which a resin deflects by a predetermined distance under a predetermined load. Hereinafter, for simplicity of description, the resin material for forming the base member 1 is referred to as a "first resin material", and the resin material for forming the resin layer 3 is referred to as a "second resin material".

Since the resin layer 3 is formed from the second resin material having a lower deflection temperature under load than that of the first resin material for forming the base member 1, the resin layer 3 is more easily deformed and spread against a stress applied in attachment (a bending stress or a tensile stress generated when the decorative sheet 10 is caused to follow the unevenness of the surface of the molded article body 21) than the base member 1. Therefore, the metal layer 4 which is in contact with the resin layer 3 follows the contour and shape of the surface of the resin layer 3 which is more easily spread than the base member 1, so as to be preferably spread during attaching. Therefore, in the decorative sheet 10 according to preferred embodiments of the present invention, the breakage of the metal layer 4 is effectively prevented. As a result, a beautiful appearance can be achieved.

The second resin material for forming the resin layer 3 is preferably a resin material having a deflection temperature under load of about 85° C. or less which is measured under a load of about 0.45 MPa in accordance with ASTM D648. The standards "ASTM D648" are the standards of a method of measuring a deflection temperature under load established by American Society for Testing and Materials. In the standards, a piece to be tested is heated under a specific bending load, and a temperature at which a predetermined amount of deflection occurs is determined to be a deflection temperature under load. When the deflection temperature under load of the second resin material exceeds about 85° C., the deforming and spreading properties of the resin layer 3 against the stress in attaching are sometimes insufficient. The second resin material is preferably a resin material having a deflection temperature under load of about 30° C. or more measured under a load of about 0.45 MPa in accordance with ASTM D648. If the deflection temperature under load is lower than about 30° C., the resin layer 3 is too easily flowed due to the pressure in shaping (in attaching), so that defects such as wrinkles or breakage of the metal layer 4 may occur. When the deflection temperature under load of the second resin material is not lower than about 30° C. and not higher than about 85° C., the effect that breakage of the metal layer 4 is effectively prevented can be more reliably achieved.

As the second resin material, a thermoplastic resin material can be preferably used. For example, a thermoplastic polyurethane resin can be preferably used. Alternatively, a silicone resin can be preferably used. More specifically, a polyurethane resin or a silicone resin which is prepared by using much of the materials having the number of functional group of 2, and which has a weight-average molecular weight of about 20,000 to about 100,000 can be preferably used.

Figure 4A:
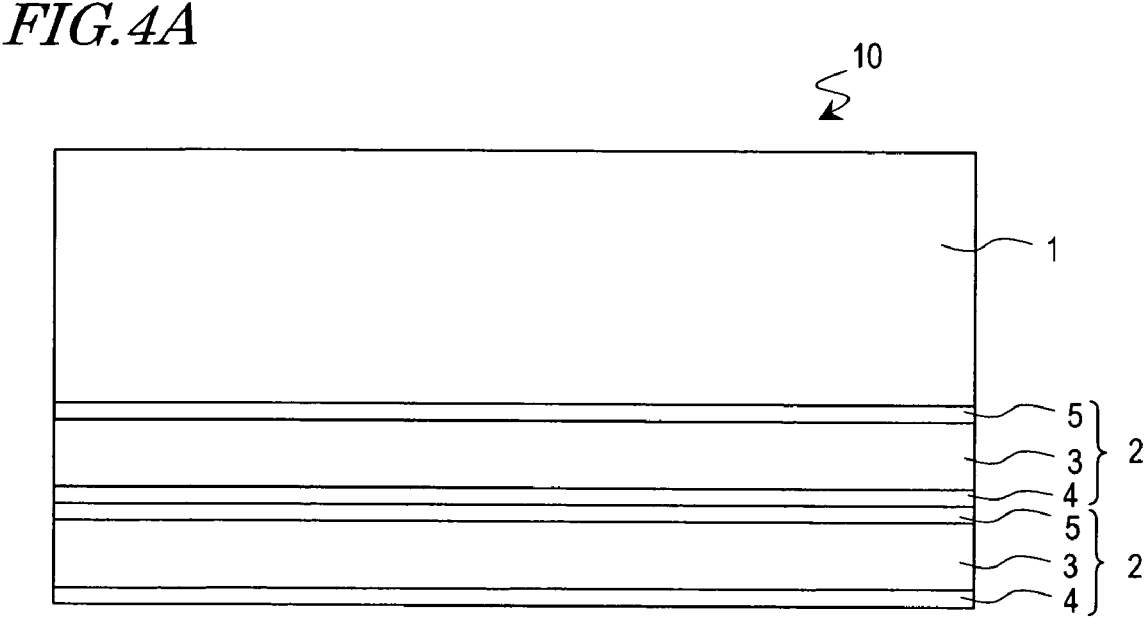
FIGS. 4A and 4B are sectional views schematically showing another preferred embodiment of the decorative sheet 10 according to the present invention.
Figure 4B:
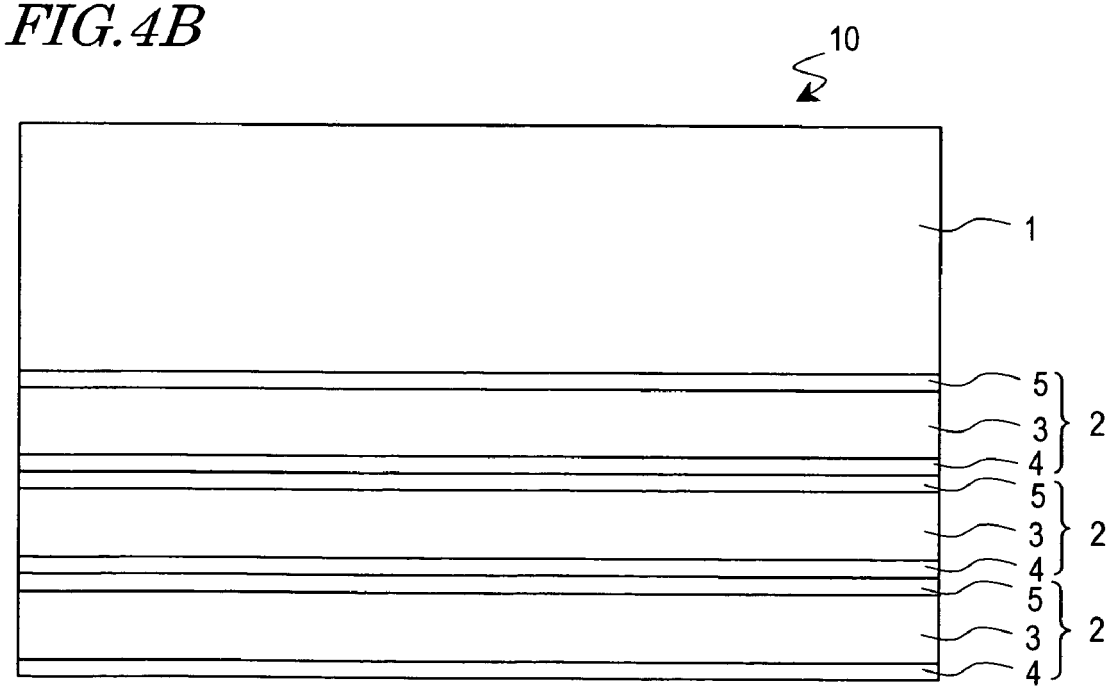

FIGS. 1 and 2 exemplarily show the structure in which one decoration layer 2 is disposed. Alternatively, as shown in FIGS. 4A and 4B, a plurality of decoration layers 2 may be disposed. As for the metal layer 4, since the light reflectivity varies depending on the thickness thereof, a predetermined thickness is required for realizing a desired metallic luster. If the thickness of the metal layer 4 is excessive, a high spreading property cannot be obtained depending on the kind of a metal material in some cases. As shown in FIGS. 4A and 4B, if a plurality of decoration layers 2 are disposed, a plurality of metal layers 4 contribute to the reflection of light, so that respective metal layers 4 can be thin. Therefore, a desired metallic luster can be realized, while the spreading property of the metal layers 4 is maintained to be high.

Figure 5A:
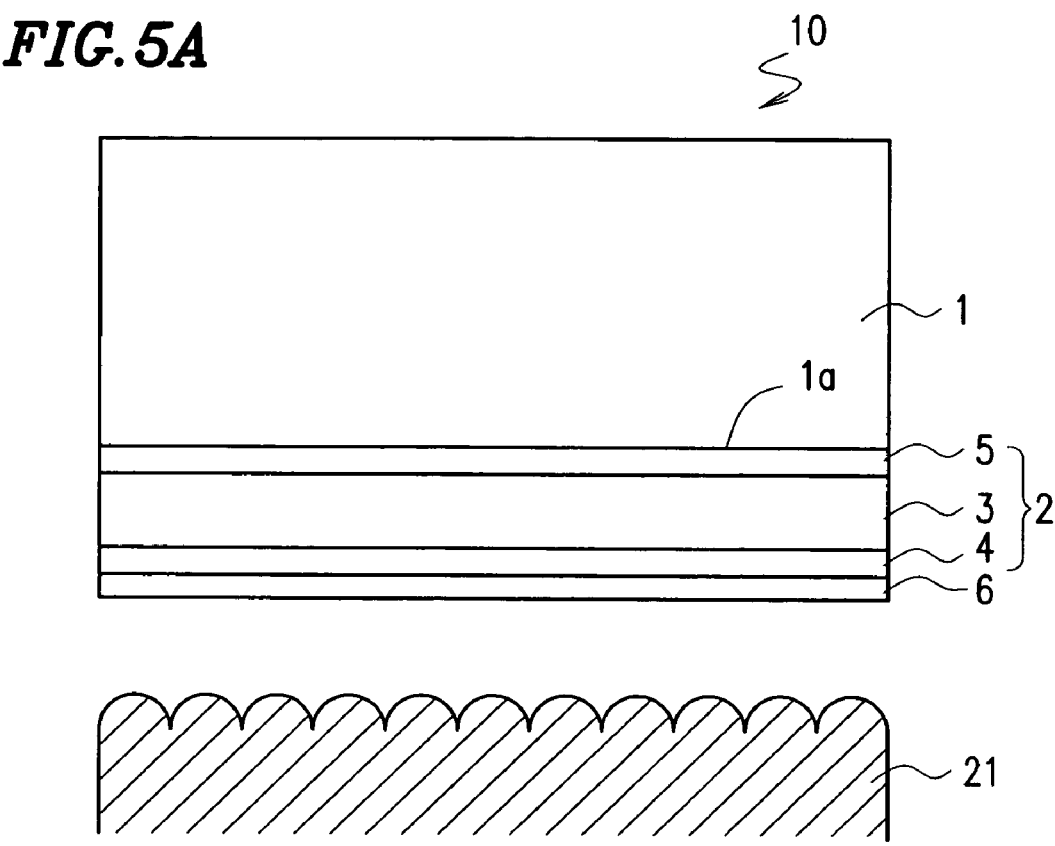
FIGS. 5A and 5B are views illustrating a condition of a decoration layer when the decorative sheet according to a preferred embodiment of the present invention is joined to a molded article body having a grain.
Figure 5B:
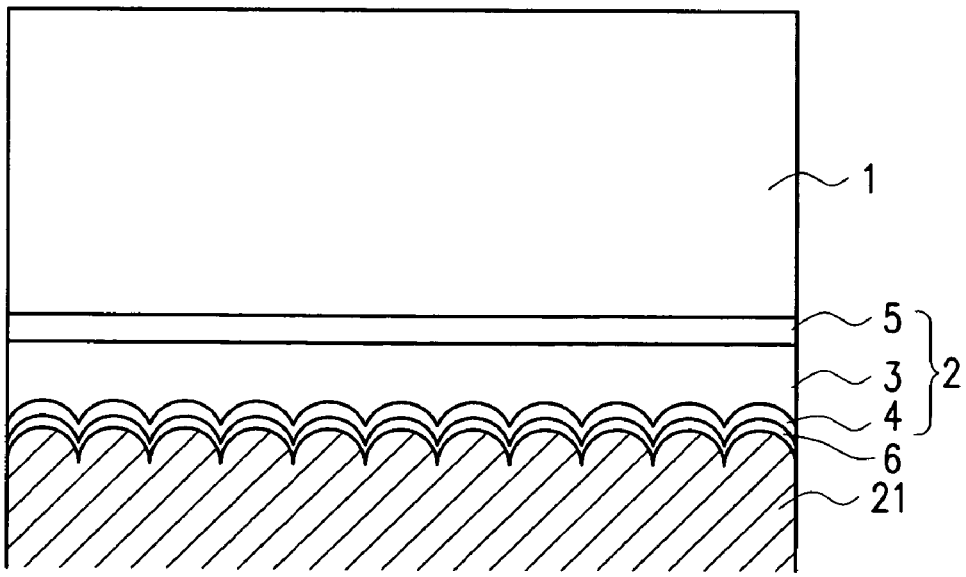

In this preferred embodiment, the resin layer 3 is preferably located at a position that is closer to the base member 1 than the metal layer 4. The present invention is not limited to this structure. The metal layer 4 may be located at a position that is closer to the base member 1 than the resin layer 3. If the resin layer 3 is located at a position that is closer to the base member 1 than the metal layer 4, a minute structure formed on the surface of the molded article body can be reflected in the appearance. Hereinafter, with reference to FIGS. 5A and 5B, this point will be described in more detail. FIG. 5A shows a condition before the decorative sheet 10 is attached to the molded article body 21. FIG. 5B shows a condition after the decorative sheet 10 is attached to the molded article body 21. The attachment of the decorative sheet 10 is performed at a temperature that is substantially equal to or higher than the deflection temperature under load of the second resin material.

On the surface of the molded article body 21 shown in FIGS. 5A and 5B, a minute projections-and-depressions structure which looks like wrinkles, i.e., so-called "grain" is formed. The grain is typically a projections-and-depressions structure in which the maximum distance Rmax from the deepest point to the highest point is not less than about 300 μm and not more than about 1,000 μm. The grain in this preferred embodiment has a maximum distance Rmax of about 500 μm formed by using a vacuum/pressure forming method.

As shown in FIG. 5A, in the case where the resin layer 3 is located at a position that is closer to the base member 1 than the metal layer 4, when the decorative sheet 10 is attached to the molded article body 21, the metal layer 4 is closer to the molded article body 21 than the resin layer 3. Accordingly, as shown in FIG. 5B, the metal layer 4 is deformed so as to have a form reflecting the form of the grain, and light is reflected from the metal layer 4 which is deformed in this way. Therefore, it is possible to reflect the grain in the appearance. At this time, the surface of the resin layer 3 on the side of the metal layer 4 is deformed by following the deformation of the metal layer 4. However, since the second resin material is in a condition where it can sufficiently deform (plastic deformation), the surface thereof on the side of the base member 1 is not deformed. That is, the resin layer 3 positioned between the metal layer 4 and the base member 1 functions as a cushion for reducing the influence of the deformation of the metal layer 4 to the base member 1. Accordingly, the form of the grain is not reflected on the principal surface 1a or a back surface (a surface opposite to the principal surface 1a) of the base member 1, and the form of the back surface (functioning as a surface of the decorative sheet 10) of the base member 1 is smoother than the surface of the metal layer 4. Thus, the luster of the base member 1 is not deteriorated. Therefore, a tasteful appearance in which the grain-like wrinkle is reflected, and having a high luster can be attained.

Table 1 shows the results of appearance evaluation when the deflection temperature under load of the second resin material is varied. Table 1 shows the case where a decorative sheet 10 including a base member 1, preferably formed from polycarbonate, having a thickness of about 500 μm, a metal layer 4, preferably formed from tin, having a thickness of about 1 μm, and a resin layer 3 having a thickness of about 25 μm is attached to a surface of a molded article body 21 on which a grain with a difference in height between the deepest point and the highest point of about 0.2 mm is formed at a shaping temperature of about 195° C. Table 1 evaluates whether the grain formed on the surface of the molded article body 21 can be reflected in the appearance or not. Table 1 also evaluates the whitening of the decorative sheet 10.

TABLE 1

| Second Resin Material | Deflection Temperature under Load (° C.) | Reflection of Grain | Remarks |
|---|---|---|---|
| UP | 35 | With Grain | |
| | 50 | With Grain | |
| | 90 | Thin Grain | |
| PVC | 50 | With Grain | |
| | 90 | Without Grain | |
| EVA | 60 | With Grain | |
| PP | 110 | Without Grain | Whitening |
| PET | 80 | With Grain | Whitening |
| PMMA | 70 | With Grain | |
| | 100 | Without Grain | |
| LDPE | 30 | With Grain | Whitening |

As is seen from Table 1, when the deflection temperature under load of the second resin material exceeds about 85° C., the grain becomes weak or does not appear. This is because if the deflection temperature under load of the second resin material exceeds about 85° C., the function of the resin layer 3 of absorbing the stress caused by the deformation of the metal layer 4 is deteriorated, so that a deformation failure of the metal layer 4 may occur. For this reason, it is preferred that the deflection temperature under load of the second resin material be about 85° C. or less. As described above, in order to prevent the excess flow of the resin layer 3 in shaping, it is preferred that the deflection temperature under load of the second resin material be about 30° C. or more. Accordingly, when the deflection temperature under load of the second resin material is not less than about 30° C. and not more than about 85° C., the resin layer 3 functions as a stress absorbing layer in just proportion for the deformation of the metal layer 4.

Next, preferred structures of respective components of the decorative sheet 10 will be described.

In order to effectively prevent the breakage of the metal layer 4, it is preferred that the metal layer 4 be formed from a metal material having a high spreading property (a high extensibility). The metal layer 4 formed from a metal material having a high spreading property may easily deformed as shown in FIG. 5B. Thus, in view of easily reflecting a minute structure on the surface of the molded article body 21 to improve the appearance, the metal layer 4 may preferably be formed from a metal material having a high spreading property. As a material with a high spreading property, specifically, tin, aluminum, gold, copper, zinc, silver, and indium, and alloys thereof may be used to form the metal layer 4.

Table 2 shows the results of appearance evaluations when the material of the metal layer 4 is changed. Table 2 shows the case where two decoration layers 2 are disposed as shown in FIG. 4A. Table 2 also shows the case where a decorative sheet 10 includes a base member 1, formed from polycarbonate, having a thickness of about 500 μm, a resin layer 3, formed from polyurethane, having a thickness of about 18 μm, and an adhesive layer 5, formed from polyurethaneacrylate, having a thickness of about 1.5 μm. Table 2 evaluates whether the grain formed on the surface of the molded article body 21 can be observed in the appearance or not.

TABLE 2

| Thickness of Metal Layer (μm) | Platinum | Gold | Tin | Nickel |
|---|---|---|---|---|
| 0.5 | With Grain | With Grain | With Grain | Without Grain |
| 1 | Without Grain | With Grain | With Grain | Without Grain |
| 2 | Without Grain | With Grain | With Grain | Without Grain |

As is seen from Table 2, if the material of the metal layer 4 is gold or tin, the grain can be reflected in all of the cases of about 0.5 μm, about 1 μm, and about 2 μm in thickness. On the contrary, if the material is platinum, the thickness is required to be about 0.5 μm or less in order to reflect the grain. If the material is nickel, the grain cannot be reflected in all of the cases of about 0.5 μm, about 1 μm, and about 2 μm in thickness.

The preferred materials of the metal layer 4 are not limited to those exemplarily described in the above description. Generally, a softer metal has a higher spreading property. If metal having Mohs' hardness of about 3 or less is used, the spreading property of the metal layer 4 can be sufficiently high. Table 3 shows Mohs' hardnesses of various kinds of metal materials. As is seen from Table 3, all of tin, aluminum, gold, copper, zinc, silver, and indium have Mohs' hardness of about 3 or less, so that they can be preferably used as the material for the metal layer 4.

TABLE 3

| | Mohs' Hardness |
|---|---|
| Indium | 1.2 |
| Tin | 1.5-1.8 |
| Zinc | 2 |
| Silver | 2 |
| Aluminum | 2.0-2.9 |
| Copper | 2.5-3.0 |
| Gold | 2.5 |
| Platinum | 4.3 |
| Nickel | 5 |
| Chromium | 7 |

The thickness of the metal layer 4 is preferably not less than about 0.2 μm and not more than about 1.2 μm. If the thickness of the metal layer 4 is less than about 0.2 μm, the light reflectivity of the metal layer 4 is low, and the color may sometimes be weak. If the thickness of the metal layer 4 exceeds about 1.2 μm, a sufficiently high spreading property cannot be obtained, in some cases. Table 4 shows the results of appearance evaluation when the thickness of the metal layer 4 formed from tin and the accumulation number of decoration layers 2 are varied.

TABLE 4

| | | Thickness of Resin Layer (μm), Thickness of Adhesive Layer (μm) | | | | |
|---|---|---|---|---|---|---|
| Resin Layer | | 8 | 8 | 8 | 18 | 38 |
| Adhesive Layer | | 1.5 | 1.5 | 1.5 | 1.5 | 1.5 |
| | | Number of Decoration Layers | | | | |
| | | 1 | 2 | 4 | 5 | 5 |
| | | Total Thickness of Decoration Layers (μm) | | | | |
| | | About 10 | About 20 | About 40 | About 100 | About 200 |
| Thickness of Metal Layer (μm) | 0.2 | Thin Grain | With Grain | Thin Grain | Without Grain | Without Grain |
| | 0.5 | Thin Grain | With Grain | With Grain | Thin Grain | Without Grain |
| | 0.7 | With Grain | With Grain | With Grain | Thin Grain | Without Grain |
| | 0.9 | With Grain | With Grain | With Grain | Thin Grain | Without Grain |
| | 1.2 | With Grain | Thin Grain | Thin Grain | Thin Grain | Without Grain |

As shown in Table 4, when the accumulation number of decoration layers 2 is relatively small, and the total thickness of the decoration layers 2 is relatively small, good evaluation results can be obtained in the thickness range of about 0.2 μm to about 1.2 μm of the metal layer 4. On the other hand, when the accumulation number of decoration layers 2 is relatively large, and the total thickness of the decoration layers 2 is relatively large, the grain gets thinner, and it is difficult to observe the grain. Specifically, when the total thickness of the decoration layers 2 exceeds about 100 μm, the grain is remarkably thin. If the total thickness is about 200 μm, the grain is hardly observed. Accordingly, in order to reflect the grain in the appearance, it is preferred that the total thickness of the decoration layers 2 be about 100 μm or less.

As the first resin material for forming the base member 1, a thermoplastic resin material can be preferably used. For example, polycarbonate can be preferably used. The deflection temperature under load of polycarbonate is about 140° C. to about 200° C. It is understood that, instead of polycarbonate, polymethyl methacrylate (PMMA), polyolefine, polyethylene terephthalate (PET), or other suitable material may be used. Rigidity as a sheet member is required for the base member 1. Accordingly, it is preferred that the first resin material be selected in view of this point. Since the base member 1 is positioned on the outermost surface of the molded article 20 after the attachment, the base member 1 is preferably superior in weather resistance and resistance to damage. Alternatively, on a surface of the base member 1 opposite to the side of the decoration layer 2, a protection layer which is superior in weather resistance and resistance to damage may be formed.

The thickness of the base member 1 is preferably not lower than about 100 μm and not less than about 1,000 μm. If the thickness of the base member 1 is less than about 100 μm, it is difficult to deal the base member 1 as a sheet, and the strength is not sufficient, so that the base member 1 may be broken during the attachment. If the thickness of the base member 1 exceeds about 1,000 μm, the following property for the surface of the molded article body 21 may sometimes be deteriorated.

Figure 6A:
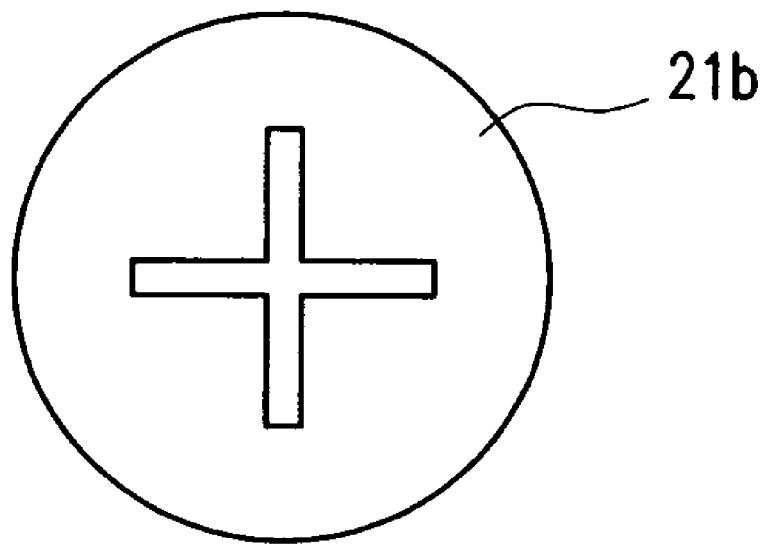
FIG. 6A is a top view schematically showing a protruding portion which looks like a screw (an artificial screw), and 6B is a perspective view thereof.
Figure 6B:
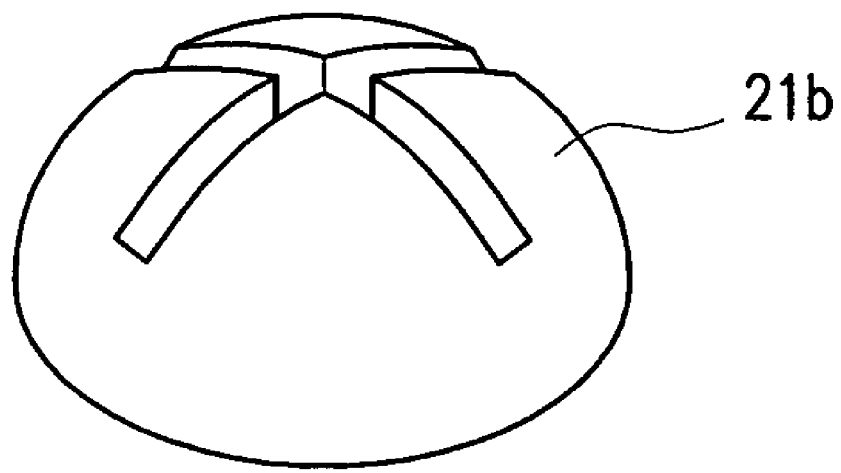

Table 5 shows the results of appearance evaluation when the thickness of the base member 1 and the accumulation number of decoration layers 2 are varied. Table 5 shows the case where the base member 1 is formed from polycarbonate, and one to six decoration layers 2 each including the resin layer 3 having a thickness of about 18 μm, the metal layer 4 having a thickness of about 0.5 μm, and the adhesive layer 5 having a thickness of about 1.5 μm are disposed. In Table 5, a protruding portion (an artificial screw) 21b having a height of about 5 mm, which looks like a screw as shown in FIGS. 6A and 6B, is formed on the surface of the molded article body, and it is evaluated whether the protruding portion 21b can be observed well or not after the attachment of the decorative sheet 10. In the table, "⊚" indicates that the artificial screw 21b is observed very well, "○" indicates that the artificial screw 21b is observed well, and "Δ" indicates that the artificial screw 21b is not observed well.

TABLE 5

| | | | | Thickness of Base Member (μm) | | | | |
|---|---|---|---|---|---|---|---|---|
| | | | | 200 | 500 | 800 | 1000 | 1200 |
| Number of Decoration Layers | 1 | Total Thickness of Decoration Layers (μm) | 20 | ⊚ | ○ | ○ | Δ | Δ |
| | 2 | | 40 | ⊚ | ⊚ | ⊚ | ○ | Δ |
| | 3 | | 60 | ⊚ | ⊚ | ⊚ | ⊚ | Δ |
| | 4 | | 80 | ⊚ | ⊚ | ○ | Δ | Δ |
| | 5 | | 100 | ⊚ | ○ | Δ | Δ | Δ |
| | 6 | | 120 | ○ | Δ | Δ | Δ | Δ |

As shown in Table 5, as the base member 1 becomes thicker, it becomes difficult to observe the artificial screw 21b. This is because, as the base member 1 becomes thicker, the following property of the decorative sheet 10 to the artificial screw 21b becomes deteriorated. Accordingly, in view of the point that the ability to follow the unevenness of the surface of the molded article body 21 is increased, thereby obtaining good appearance, it is preferred that the base member 1 be thin. Specifically, the base member 1 preferably has a thickness of about 1,000 μm or less. However, as described above, if the base member 1 is too thin, it is difficult to handle the base member 1 as a sheet, or the strength is insufficient, thereby causing the base member 1 to broken during the attaching process. It is preferred that the thickness of the base member 1 be determined in view of these points. Thus, the thickness of the base member 1 is preferably about 100 μm or more.

As described above, in order to reflect the grain in the appearance, it is preferred that the total thickness of the decoration layers 2 is about 100 μm or less. As shown in Table 5, if the total thickness of the decoration layers 2 exceeds about 100 μm, it is difficult to observe the artificial screw 21. Accordingly, also in view of the property of being able to follow the unevenness which is larger than the grain (a head portion of a screw, or a step or roughness included in the molded article body), it is preferred that the total thickness of the decoration layer 2 is about 100 μm or less.

As a material of the adhesive layer 5 for attaching the decoration layer 2 to the base member 1, polyurethane acrylate, polyurethane, or acrylic resin, for example, can be used. The materials are not limited to these, but a material which can attach the resin layer 3 or the metal layer 4 to the base member 1 may be used. The thickness of the adhesive layer 5 is preferably about 1 μm to about 20 μm, for example.

Next, with reference to FIGS. 7A to 7C and FIGS. 8A to 8C, the production method of a molded article using the decorative sheet 10 will be described.

First, a molded article body 21 and a decorative sheet 10 are prepared. The molded article body 21 may be formed from a resin material, formed from a metal material, or formed from other materials. The molded article body 21 can be prepared using a known technique. If a resin material is used, the molded article body 21 can be prepared by injection molding, for example. The decorative sheet 10 can be fabricated by using the above-described materials by a known technique. For example, the decorative sheet 10 can be prepared in the following manner. On a film as a resin layer 3, a metal material is vapor deposited, so as to form a metal layer 4, thereby forming a decoration layer 2. A required number of decoration layers 2 are laminated on a principal surface 1a of a base member 1, thereby fabricating the decorative sheet 10. When the decoration layers 2 are to be laminated, an adhesive can be used, for example.

Figure 7A:
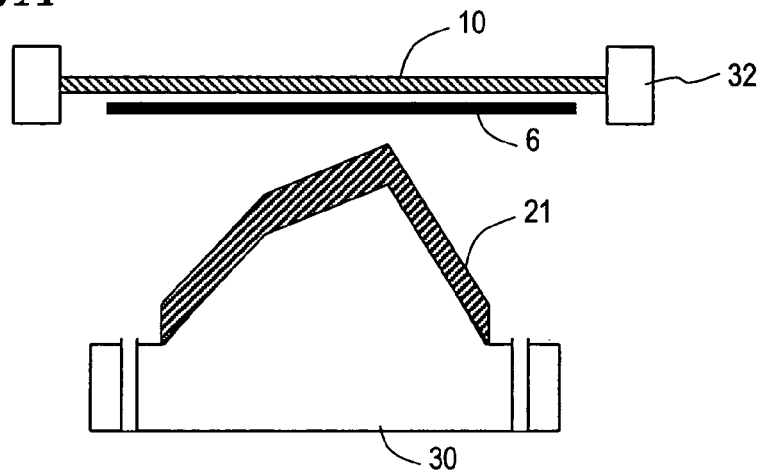
FIGS. 7A, 7B, and 7C are process sectional views schematically showing a production method of a molded article using the decorative sheet 10 according to a preferred embodiment of the present invention.

Next, as shown in FIG. 7A, the molded article body 21 is placed on a supporting device 30. The decorative sheet 10 is fixed by a holding device 32 so that the decorative sheet 10 is positioned above the molded article body 21. At this time, an adhesive 6 is applied on the decoration layer 2 of the decorative sheet 10.

Figure 7B:
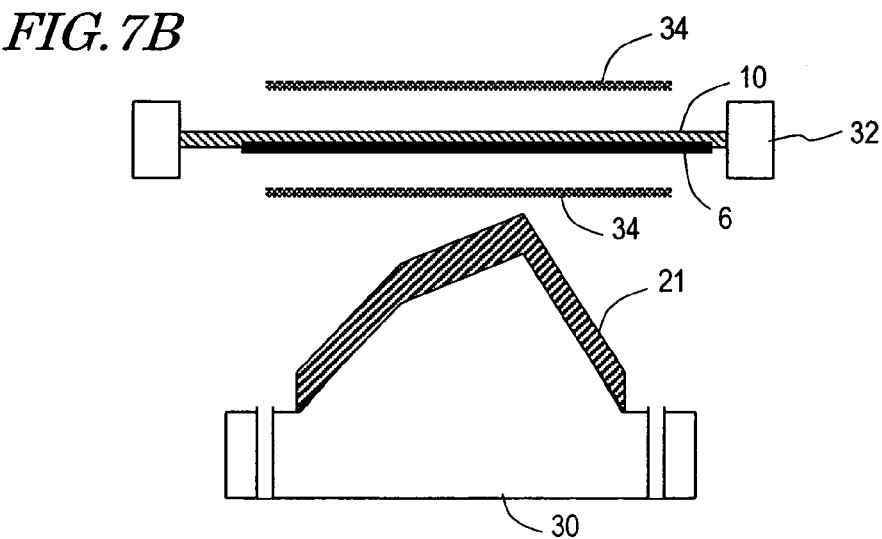

Next, as shown in FIG. 7B, the decorative sheet 10 is heated by using a heater 34, thereby softening the decorative sheet 10. At this time, the decorative sheet 10 is heated up to a temperature which is higher than the deflection temperature under load of the second resin material for forming the resin layer 3. Typically, the decorative sheet 10 is heated up to a temperature which is higher than the deflection temperature under load of the first resin material for forming the base member 1. In order to preferably perform the spreading of the decorative sheet 10, when the deflection temperature under load of the first resin material is $T_{DUL}$, it is preferred that the decorative sheet 10 be heated to temperatures in the range of about $(T_{DUL}-40)°$ C. to about $(T_{DUL}+20)°$ C. At temperatures less than about $(T_{DUL}-40)°$ C., it is difficult to deform the first resin material. Thus, in the shaping (in the attachment), breakage may occur, or the shaping cannot be performed in some cases. On the other hand, at temperatures greater than about $(T_{DUL}+20)°$ C., the sags of the sheet in heating remarkably occur, so that it is difficult to perform the shaping in some cases. Irrespective of the temperatures in heating, a difference between the deflection temperature under load of the second resin material and the heating temperature is larger than a difference between the deflection temperature under load of the first resin material and the heating temperature, so that the resin layer 3 is in a condition where it can be easily deformed and spread than the base member 1. The heater 34 is preferably a far infrared heater, for example.

Figure 7C:
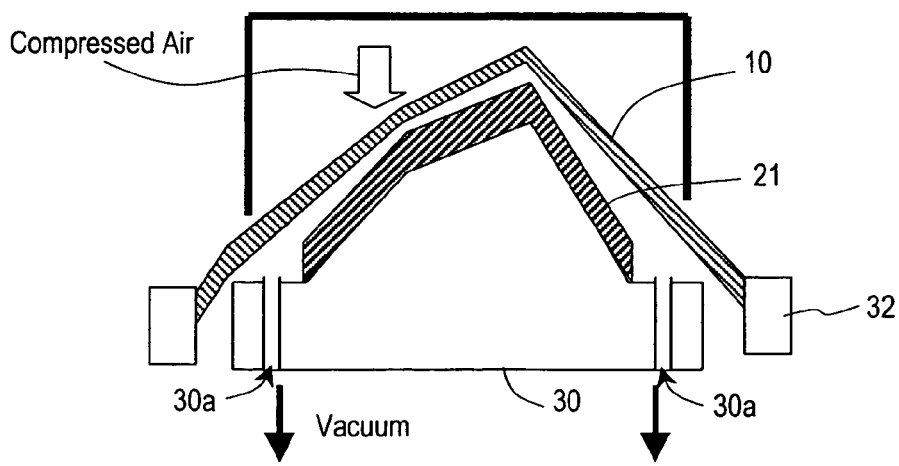
Figure 8A:
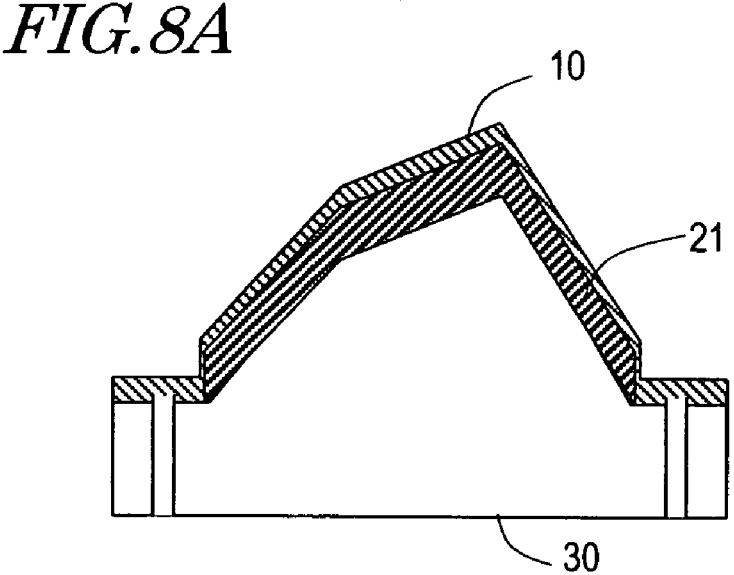
FIGS. 8A, 8B, and 8C are process sectional views schematically showing a production method of a molded article using the decorative sheet 10 according to a preferred embodiment of the present invention.

Thereafter, as shown in FIG. 7C, after the decorative sheet 10 and the molded article body 21 are overlapped, the air existing between the decorative sheet 10 and the molded article body 21 is removed, thereby joining the decorative sheet 10 to the molded article body 21, as shown in FIG. 8A. When the air existing between the decorative sheet 10 and the molded article body 21 is removed, a difference in pressure occurs between a side of the decorative sheet 10 facing the molded article body 21 and the other side thereof. Thus, the decorative sheet 10 is pressed against the molded article body 21 with a substantially uniform pressure. Therefore, the joining of the decorative sheet 10 and the molded article body 21 is suitably performed. In this preferred embodiment, additionally, in this process step, compressed air is supplied to a space expanding on the side opposite to the molded article body 21 with respect to the decorative sheet 10, thereby causing a larger difference in pressure. The overlapping of the decorative sheet 10 onto the molded article body 21 is performed by lowering the holding device 32 by an elevator apparatus, for example. The removal of the air between the decorative sheet 10 and the molded article body 21 is preferably performed by using a vacuum pump, for example, thereby sucking the air through an opening portion 30a disposed in the supporting device 30. The supply of the compressed air is preferably performed by a compressor, for example.

Figure 8B:
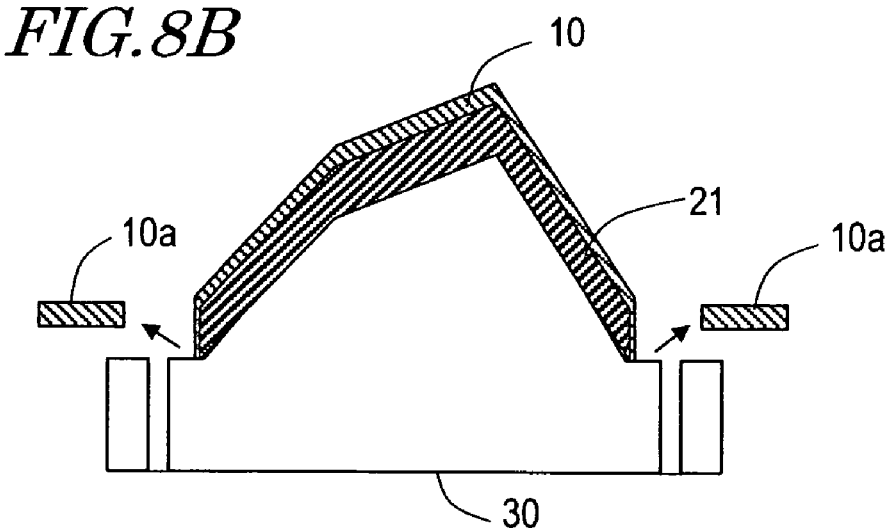
Figure 8C:
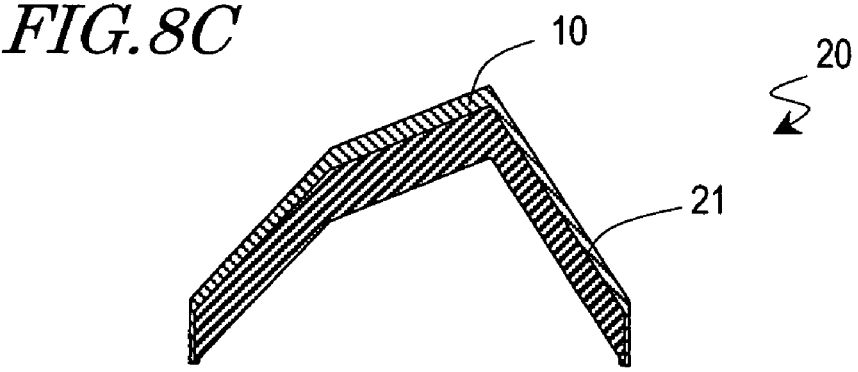

Next, as shown in FIG. 8B, unnecessary portions 10a of the decorative sheet 10 are cut (trimmed) by a cutting device such as a rotary blade. Thereafter, the molded article body 21 is released from the supporting device 30, thereby completing a molded article 20, as shown in FIG. 8C.

According to the above-described production method, the joining of the decorative sheet 10 to the molded article body 21 (i.e., the shaping of the decorative sheet 10) can be performed in a very short period of time (in less than one second, for example). In addition, the decorative sheet 10 according to preferred embodiments of the present invention is used, so that even if the decorative sheet 10 is shaped and joined in such a short time, no breakage occurs in the metal layer 4, and the beauty in appearance is not deteriorated.

Figure 9A:
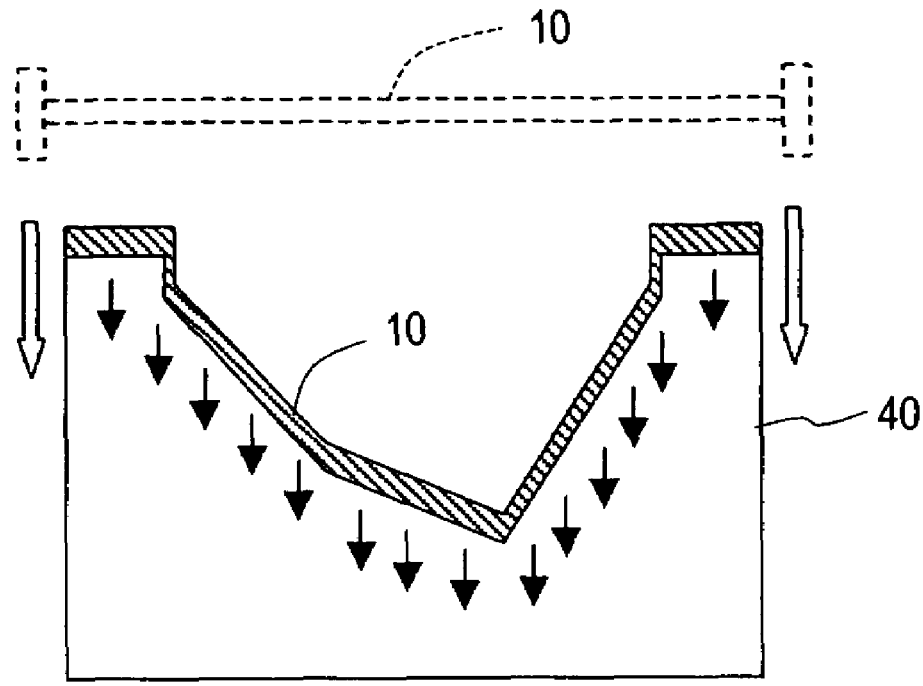
FIGS. 9A and 9B are process sectional views schematically showing another production method using the decorative sheet 10 according to a preferred embodiment of the present invention.
Figure 9B:
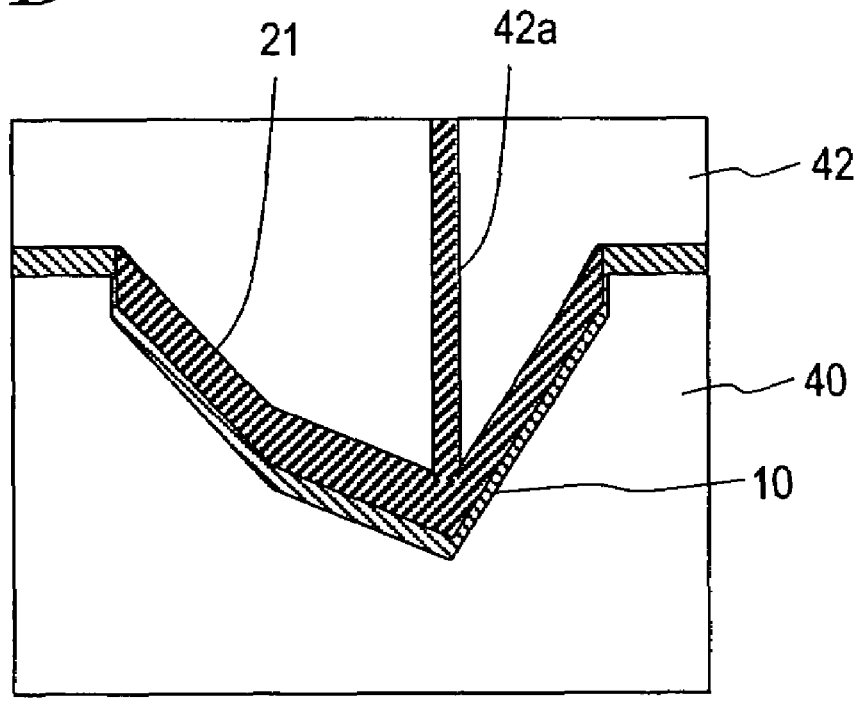

The decorative sheet 10 according to preferred embodiments of the present invention is not limited to the production method in which the decorative sheet 10 is joined to the molded article body 21 which is already molded as described with reference to FIGS. 7A to 7C and FIGS. 8A to 8C (referred to as a "film on" method), but can be applied to other production methods. FIGS. 9A and 9B schematically show a production method referred to as a "film insert" method.

In the film insert method, first, as shown in FIG. 9A, a decorative sheet 10 is shaped in a vacuum along a surface of a female die 40. Although not shown in the figure, uncounted numbers of opening portions are disposed in the surface of the female die 40. Through the opening portions, the air existing between the female die 40 and the decorative sheet 10 is exhausted, thereby performing the vacuum shaping of the decorative sheet 10.

Thereafter, as shown in FIG. 9B, a resin material is injected under pressure through a resin injecting port 42a of a male die 42, so as to molding the molded article body 21, and to join the molded article body 21 and the decorative sheet 10.

As described above, the decorative sheet 10 according to preferred embodiments of the present invention can be used in the film insert method. However, the film insert method requires both of the female die 40 and the male die 42. That is, two expensive dies are always required. This necessarily results in increases of the production cost. In vacuum shaping of the decorative sheet 10, the surface of the decorative sheet 10 is in contact with the surface of the female die 40 which includes openings for evacuation, so that projections and depressions are formed on the surface of the decorative sheet 10. As a result, the beautiful appearance may be diminished and deteriorated. In addition, the process step of injecting the resin material under pressure is required. Thus, the decorative sheet 10 is required to have high heat resistance and high pressure resistance. When the resin material is injected under pressure, a large force is locally applied to the decorative sheet 10. Thus, the decorative sheet 10 may be broken in some cases. In this method, the molded article body 21 is limited to be formed from the resin material.

On the contrary, in the film on method described with reference to FIGS. 7A to 7C and 8A to 8C, two dies are not necessarily required, so that the production cost can be reduced. The joining of the decorative sheet 10 is performed by removing the air existing between the decorative sheet 10 and the molded article body 21, so that a substantially uniform force can be applied to the entire surface of the decorative sheet 10. Thus, the breakage of the decorative sheet 10 can be prevented. In addition, the surface of the decorative sheet 10 on the side of the base member 1 is not required to be in contact with the openings for evacuation, so that any projections and depressions are not formed on the surface of the decorative sheet 10. Thus, the beautiful appearance is not diminished or deteriorated. In addition, the process step of injecting the resin under pressure is not required, so that the joining and the shaping of the decorative sheet 10 can be performed at a lower temperature and at a lower pressure as compared with the film insert method. Thus, the decorative sheet 10 with lower temperature resistance and pressure resistance can be used. According to the film on method, not only the molded article body 21 formed from the resin material, but also the molded article body 21 formed from a metal material or other materials can be decorated.

Second Preferred Embodiment

Figure 10:
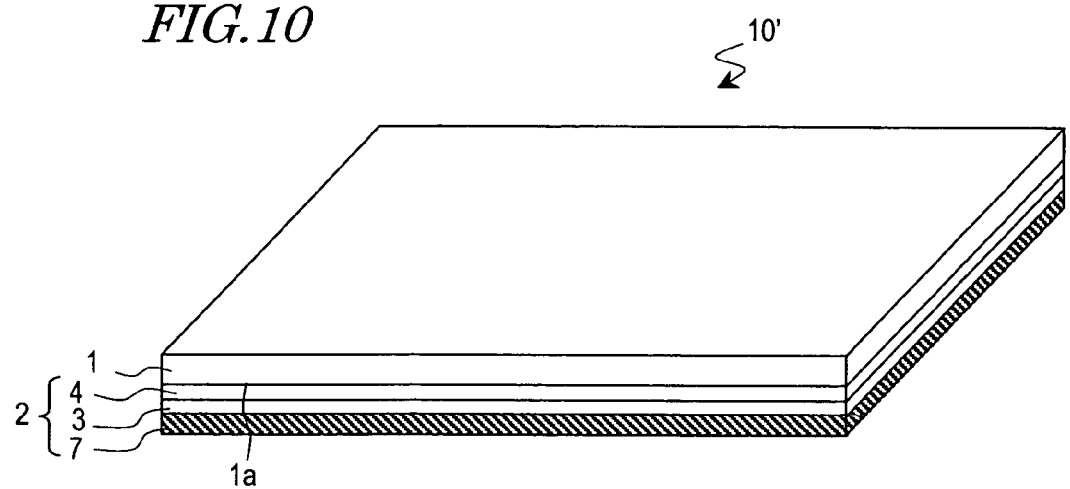
FIG. 10 is a perspective view schematically showing another decorative sheet 10' according to a preferred embodiment of the present invention.
Figure 11:
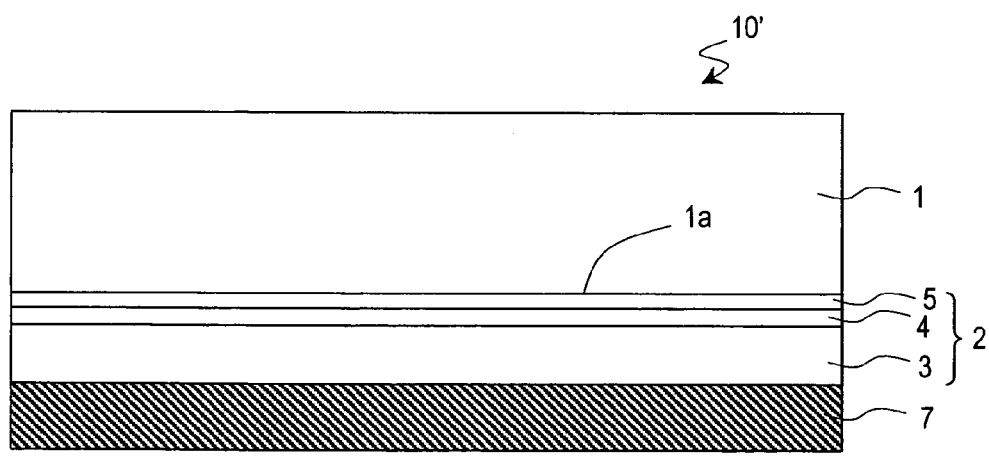
FIG. 11 is a sectional view schematically showing the decorative sheet 10' according to a preferred embodiment of the present invention.

With reference to FIGS. 10 and 11, a decorative sheet 10' in this preferred embodiment will be described. In the figures, identical reference numerals are used for designating substantially the same components as those of the decorative sheet 10 in the first preferred embodiment, and the descriptions thereof are omitted.

As shown in FIGS. 10 and 11, the decorative sheet 10' is different from the decorative sheet 10 in the first preferred embodiment in that the decorative sheet 10' includes a coloring layer 7 disposed on the decoration layer 2. In this preferred embodiment, the decoration layer 2 has a structure in which the metal layer 4 is disposed in a position closer to the base member 1 than the resin layer 3. The coloring layer 7 is formed on the resin layer 3.

In the decorative sheet 10' in this preferred embodiment, the decoration layer 2 also has a laminated structure including the resin layer 3 and the metal layer 4. The resin layer 3 is formed from the second resin material having the deflection temperature under load lower than the deflection temperature under load of the first resin material for forming the base member 1, so as to achieve the effect of preventing breakage of the metal layer 4.

Figure 12:
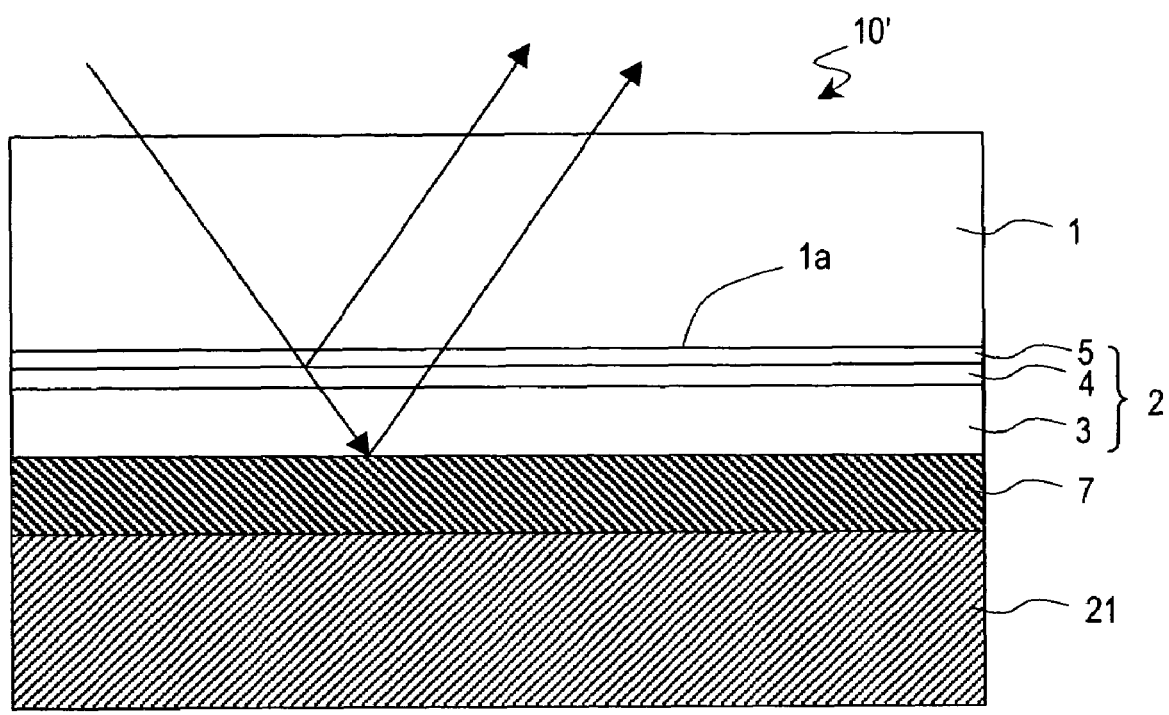
FIG. 12 is a view schematically showing a condition where the decorative sheet 10' according to a preferred embodiment of the present invention reflects light.

In this preferred embodiment, the coloring layer 7 is additionally disposed on the decoration layer 2. As shown in FIG. 12, light entering in the inside of the decorative sheet 10' is reflected from both of the metal layer 4 and the coloring layer 7. Accordingly, the decorative sheet 10' can exhibit colors having both a metallic luster generated by the metal layer 4 and the coloring generated by the coloring layer 7, that is, metallic colors having a metal-like appearance.

As a material for the coloring layer 7, for example, ink including a resin material as a binder, and pigment dispersed in the resin material can be used. The coloring layer 7 can be formed by printing with such ink. The material for the coloring layer 7 is preferably superior in heat resistance and resistance to bending. The ink disclosed in Japanese Laid-Open Patent Publication No. 2002-275405 has superior heat resistance and resistance to bending, so that the ink can be suitably used as the material for the coloring layer 7.

Table 6 shows the results of appearance evaluation when the thickness of the coloring layer 7 and the accumulated number of decoration layers 2 are varied. In Table 6, ⊚ indicates very good coloring, ○ indicates good coloring, and Δ indicates no good coloring. Table 6 shows the case where a polyurethane resin is used as the material for the resin layer 3, tin is used as the material for the metal layer 4, and ink of dark green is used as the material for the coloring layer 7.

TABLE 6

|  |  | Thickness of Resin Layer (μm), Thickness of Metal Layer (μm), Thickness of Adhesive Layer (μm) | | | | |
| --- | --- | --- | --- | --- | --- | --- |
| Resin Layer | | 8 | 8 | 18 | 18 | 18 |
| Metal Layer | | 0.5 | 0.5 | 0.5 | 0.5 | 0.5 |
| Adhesive Layer | | 1.5 | 1.5 | 1.5 | 1.5 | 1.5 |
|  |  | Number of Decoration Layers | | | | |
|  |  | 1 | 2 | 2 | 4 | 5 |
|  |  | | | Total Thickness of Decoration Layers (μm) | | |
|  |  | 10 | 20 | 40 | 80 | 100 |
| Thickness of Coloring Layer (μm) | 5 | Δ | Δ | ○ | Δ | Δ |
| | 10 | Δ | ○ | ○ | ○ | Δ |
| | 20 | Δ | ○ | ⊚ | ○ | Δ |
| | 40 | Δ | ○ | ⊚ | ○ | Δ |

As shown in Table 6, as the thickness of the coloring layer 7 is increased, the coloring becomes better. This is because as the thickness of the coloring layer 7 is increased, the light reflectivity of the coloring layer 7 is increased. Accordingly, in order to improve the coloring, it is preferred that the coloring layer 7 be thicker.

In Table 6, the coloring is not good when one decoration layer 2 is disposed. This is because the light reflectivity of the metal layer 4 is too low to sufficiently obtain a metallic luster. Also in the case where five decoration layers 2 are disposed, the coloring is not good. This is because the light reflectivity of the plurality of metal layers 4 is too high, so that the amount of light which reaches the coloring layer 7 is small. Therefore, in the case where the coloring layer 7 is disposed on the decoration layers 2 as in this preferred embodiment, it is preferred that the number of decoration layers 2 and the thickness of the metal layer 4 be appropriately determined so that the metallic luster by the metal layer 4 is sufficiently obtained, and a sufficient amount of light reaches the coloring layer 7.

In this preferred embodiment, the metal layer 4 is located at a position closer to the base member 1 than the resin layer 3, and the coloring layer 7 is formed on the resin layer 3. Alternatively, the resin layer 3 may be disposed at a location that is closer to the base member 1 than the metal layer 4, and the coloring layer 7 may be formed on the metal layer 4. As for the material of the coloring layer 7 (ink, for example), generally, the adhesion to the resin layer 3 is often higher than the adhesion to the metal layer 4. For this reason, in order to improve the adhesion between the coloring layer 7 and the decoration layer 2, the metal layer 4 is preferably located at position that is closer to the base member 1 than the resin layer 3, and the coloring layer 7 is preferably formed on the resin layer 3.

As described in the first and second preferred embodiments, the decorative sheet according to the present invention can effectively prevent the breakage of the metal layer during shaping (in joining to the molded article body), so that the decorative sheet can be suitably used for decorating a molded article body having an uneven surface. Specifically, the decorative sheet according to preferred embodiments of the present invention can be suitably used in the case where a molded article body has a fixing structure for fixing to other members or has an uneven spot such as a screw hole in the surface, in the case where a molded article body has a deep drawing shape, and in other cases.

The "deep drawing shape" is a shape having a high ratio H/D of draw depth H to draw diameter D. Specifically, the shape has the ratio H/D of about 0.75 or more. The decorative sheet joined to the surface of the molded article body having the deep drawing shape typically includes a portion having a thickness which is about 70% or less of the thickness of a portion having the largest thickness. In many cases, the decorative sheet includes a portion having a thickness which is about 50% or less of the thickness of the portion having the largest thickness.

Figure 13:
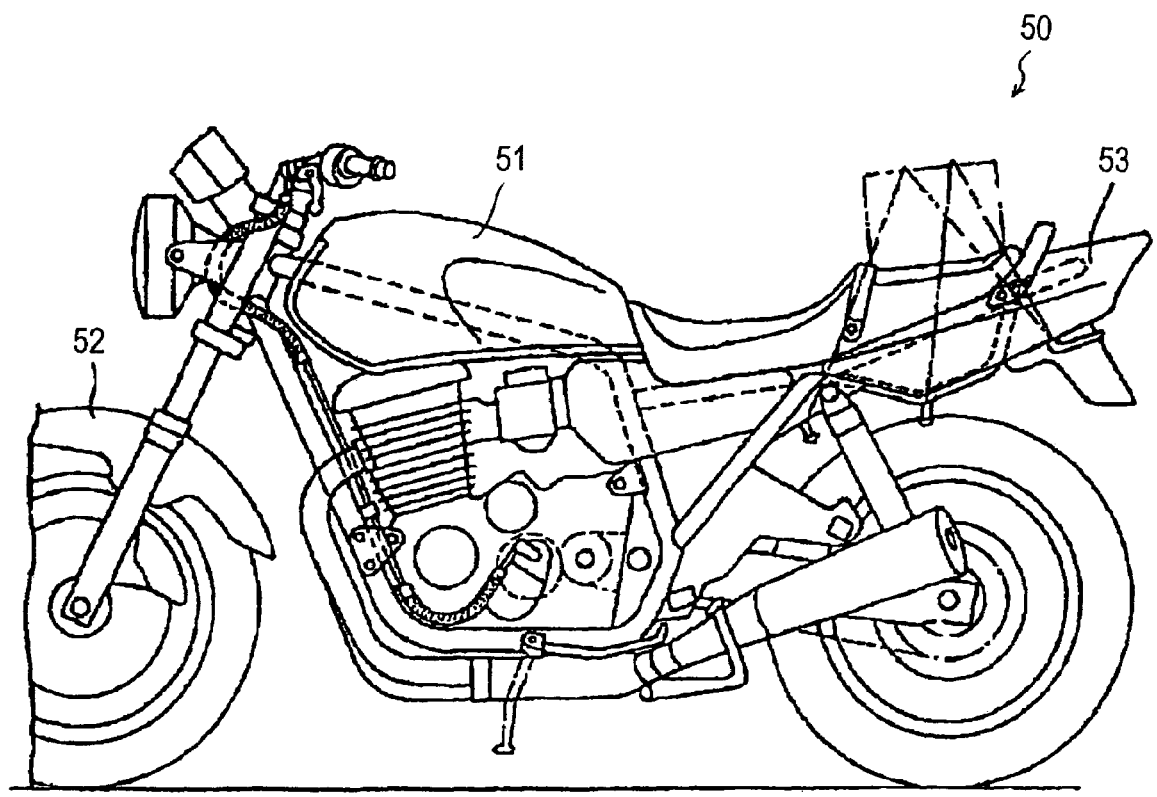
FIG. 13 is a view schematically showing a two-wheeled vehicle.

The molded article decorated by using the decorative sheet according to preferred embodiments of the present invention is suitably used for the interior or the exterior of motor vehicles. For example, the molded article is suitably used as a tank cover 51, a front fender 52, and a tail cowl 53 of a motorbike 50 shown in FIG. 13. As is well known, the term "motor vehicles" widely indicates mobile conveyances or machines for transporting passengers or merchandise, or for moving things, and includes a car, a motorbike, a bus, a truck, a tractor an airplane, a motorboat, a civil engineering vehicle, and other such devices. The motor vehicles include not only those provided with an internal combustion engine such as a gasoline engine, but also those provided with an electric motor or other type of motor or engine.

According to preferred embodiments of the present invention, a decorative sheet which can be suitably used for decorating a molded article having an uneven surface, a molded article with the decorative sheet, a production method thereof, and a motor vehicle provided with such a molded article are provided.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

This application is based on Japanese Patent Application No. 2003-395955 filed on Nov. 26, 2003, the entire contents of which are hereby incorporated by reference.

What is claimed is:

1. A decorative sheet comprising:
    a base member having first and second opposed principal surfaces; and
    at least two decoration layers disposed on one of the first and second principal surfaces of the base member; wherein
    the base member is formed from a first resin material;
    each of the at least two decoration layers includes a resin layer formed from a second resin material having a deflection temperature under load that is lower than a deflection temperature under load of the first resin material, a metal layer which is in contact with the resin layer, and a coloring layer which is in contact with the resin layer;
    no layers are disposed on the other of the first and second principal surfaces of the base member;
    the resin layer includes a first main surface and a second main surface, the first main surface being disposed closer to the base member than the second main surface;
    the metal layer is disposed on the first main surface of the resin layer; and
    the coloring layer is disposed on the second main surface of the resin layer.

2. The decorative sheet of claim 1, wherein the second resin material is a resin material having a deflection temperature under load of about 85° C. or less measured under a load of about 0.45 MPa in accordance with ASTM D648.

3. The decorative sheet of claim 1, wherein the first resin material is a thermoplastic resin material.

4. The decorative sheet of claim 1, wherein the second resin material is a thermoplastic resin material.

5. The decorative sheet of claim 1, wherein a thickness of the base member is not less than about 100 μm and not greater than about 1,000 μm.

6. The decorative sheet of claim 1, wherein the metal layer is formed of metal having a Mohs' hardness of about 3 or less.

7. The decorative sheet of claim 1, wherein the metal layer is formed of a material selected from the group of tin, aluminum, gold, copper, zinc, silver, and indium, and alloys thereof.

8. The decorative sheet of claim 1, wherein a thickness of the metal layer is not less than about 0.2 μm and not greater than about 1.2 μm.

9. The decorative sheet of claim 1, wherein a total thickness of the decoration layers is about 100 μm or less.

10. A molded article comprising a molded article body and the decorative sheet of claim 1 joined to a surface of the molded article body.

11. The molded article of claim 10, wherein the molded article body has a deep drawing shape.

12. The molded article of claim 10, wherein the decorative sheet joined to the surface of the molded article body has a first portion having the largest thickness, and a second portion having a thickness which is about 70% or less of the thickness of the first portion.

13. The molded article of claim 12, wherein the second portion of the decorative sheet includes a third portion having a thickness which is about 50% or less of the thickness of the first portion.

14. The molded article of claim 10, wherein a grain is formed on the surface of the molded article body.

15. The molded article of claim 14, wherein a surface of the metal layer has a shape reflecting the grain, and a surface of the decorative sheet opposite to the side of the molded article body is smoother than the surface of the metal layer.

16. A motor vehicle provided with the molded article of claim 10.

* * * * *

UNITED STATES PATENT AND TRADEMARK OFFICE
CERTIFICATE OF CORRECTION

PATENT NO. : 7,659,007 B2  Page 1 of 1
APPLICATION NO. : 10/972168
DATED : February 9, 2010
INVENTOR(S) : Suzuki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Thirtieth Day of November, 2010

David J. Kappos
*Director of the United States Patent and Trademark Office*